United States Patent
Shatsky et al.

(10) Patent No.: US 11,704,160 B2
(45) Date of Patent: Jul. 18, 2023

(54) REDISTRIBUTION OF PROCESSING GROUPS BETWEEN SERVER NODES BASED ON HARDWARE RESOURCE UTILIZATION

(71) Applicant: EMC IP Holding Company LLC, Hopkinton, MA (US)

(72) Inventors: Yosef Shatsky, Karnei Shomron (IL); Doron Tal, Haifa (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 189 days.

(21) Appl. No.: 17/145,646

(22) Filed: Jan. 11, 2021

(65) Prior Publication Data
US 2022/0222113 A1    Jul. 14, 2022

(51) Int. Cl.
*G06F 9/50* (2006.01)
*G06F 11/30* (2006.01)

(52) U.S. Cl.
CPC ............ *G06F 9/505* (2013.01); *G06F 9/5077* (2013.01); *G06F 9/5083* (2013.01); *G06F 11/3051* (2013.01); *G06F 2209/503* (2013.01)

(58) Field of Classification Search
CPC ...... G06F 9/505; G06F 9/5077; G06F 9/5083; G06F 11/3051; G06F 2209/503
See application file for complete search history.

(56) References Cited

U.S. PATENT DOCUMENTS

| | | |
|---|---|---|
| 5,381,539 A | 1/1995 | Yanai et al. |
| 5,551,003 A | 8/1996 | Mattson et al. |
| 5,764,880 A | 6/1998 | Gerdt et al. |
| 6,052,799 A | 4/2000 | Li et al. |

(Continued)

FOREIGN PATENT DOCUMENTS

WO PCT/US2019/024885    1/2020
WO PCT/US2019/024900    1/2020
(Continued)

OTHER PUBLICATIONS

Dell EMC, "Dell EMC VxRack FLEX," Dell EMC Product Overview, 2018, 5 pages.
(Continued)

*Primary Examiner* — Sisley N Kim
(74) *Attorney, Agent, or Firm* — Ryan, Mason & Lewis, LLP

(57) ABSTRACT

At least one processor is configured to obtain measurement information comprising an indication of an amount of utilization of a hardware resource of a first server node by a plurality of processing groups and to determine that the amount of utilization of the hardware resource is above a threshold amount of utilization. The at least one processor is further configured to select a given processing group for redistribution based at least in part on the determination that the amount of utilization of the hardware resource is above the threshold amount and on an amount of utilization of the hardware resource by the given processing group. The at least one processor is further configured to determine that a second server node comprises enough available capacity of the hardware resource and to redistribute the given processing group to the second server node based at least in part on the determination.

20 Claims, 6 Drawing Sheets

(56) References Cited

U.S. PATENT DOCUMENTS

| | | | |
|---|---|---|---|
| 6,941,420 | B2 | 9/2005 | Butterworth et al. |
| 8,843,676 | B2 | 9/2014 | Rajamanickam et al. |
| 9,372,751 | B2 | 6/2016 | McNutt |
| 9,514,014 | B2 | 12/2016 | Webman et al. |
| 9,892,045 | B1 | 2/2018 | Douglis et al. |
| 10,078,598 | B1 | 9/2018 | Wallace et al. |
| 10,331,561 | B1 | 6/2019 | Shilane et al. |
| 10,372,926 | B1* | 8/2019 | Leshinsky .............. H04L 9/083 |
| 10,445,180 | B2 | 10/2019 | Butterworth et al. |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2009/0276593 | A1 | 11/2009 | Jacobson et al. |
| 2012/0017042 | A1* | 1/2012 | Matsui .................. G06F 3/0608 |
| | | | 711/E12.016 |
| 2013/0305002 | A1 | 11/2013 | Hallak et al. |
| 2014/0068608 | A1* | 3/2014 | Kulkarni ............ G06F 9/45558 |
| | | | 718/1 |
| 2014/0244935 | A1 | 8/2014 | Ezra et al. |
| 2016/0103764 | A1 | 4/2016 | Banerjee et al. |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0227845 | A1 | 7/2019 | Sridhar et al. |

FOREIGN PATENT DOCUMENTS

| | | | |
|---|---|---|---|
| WO | 2020204880 | A1 | 10/2020 |
| WO | 2020204882 | A1 | 10/2020 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 13 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," HPCA, 10.1109/2006.1598129, pp. 200-211.

Wikipedia, "Raft (Computer Science)," https://en.wikipedia.org/wiki/Raft_(computer_science), Feb. 10, 2020, 4 pages.

Wikipedia, "Paxos (Computer Science)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

Dell Technologies, "Dell EMC PowerFlex: Secure Snapshots," Technical White Paper, Jul. 2020, 17 pages.

Dell Technologies, "Dell EMC PowerFlex: Protected Maintenance Mode," Technical White Paper, Jul. 2020, 20 pages.

Dell Technologies, "Dell EMC PowerFlex: Introduction to Replication," Technical White Paper, Jun. 2020, 34 pages.

Dell Technologies, "Dell EMC PowerFlex: Networking Best Practices and Design Considerations," Best Practices, Jun. 2020, 64 pages.

U.S. Appl. No. 16/807,709 filed in the name of Avi Puder et al. filed Mar. 3, 2020, and entitled "Management of Shared Resources in a Software-Defined Storage Environment."

U.S. Appl. No. 16/822,818 filed in the name of Itay Keller et al. filed Mar. 18, 2020, and entitled "Storage System Implementing Snapshot Longevity Ranking for Efficient Management of Snapshots."

U.S. Appl. No. 16/822,848 filed in the name of Itay Keller et al. filed Mar. 18, 2020, and entitled "Assignment of Longevity Ranking Values of Storage Volume Snapshots Based on Snapshot Policies."

U.S. Appl. No. 16/823,813 filed in the name of Itay Keller et al. filed Mar. 19, 2020, and entitled "Managing Incompressible Data in a Compression-Enabled Log-Structured Array Storage System."

U.S. Appl. No. 16/830,469 filed in the name of Roi Tagar et al. filed Mar. 26, 2020, and entitled "Storage Block Balancing Using Volume Part Migration."

U.S. Appl. No. 16/830,473 filed in the name of Yugal Peleg Lieblich et al. filed Mar. 26, 2020, and entitled "Replicated State Cluster with Standby Node State Assessment During Leadership Transition."

U.S. Appl. No. 16/830,946 filed in the name of Gil Ben Zeev et al. filed Mar. 26, 2020, and entitled "Storage Volume Migration Scheduling Based on Storage Volume Priorities and Specified Constraints."

U.S. Appl. No. 16/832,763 filed in the name of Michal Yarimi et al. filed Mar. 27, 2020, and entitled "Managing Storage Device Errors During Processing of Inflight Input/Output Requests."

U.S. Appl. No. 16/834,363 filed in the name of Itay Keller et al. filed Mar. 30, 2020, and entitled "Managing Least Recently Used Cache Using Reduced Memory Footprint Sequence Container."

U.S. Appl. No. 16/836,824 filed in the name of Itay Keller et al. filed Mar. 31, 2020, and entitled "Management of Volume Snapshots in a Data Storage System."

U.S. Appl. No. 16/888,742 filed in the name of Rivka Matosevich et al. filed May 31, 2020, and entitled "Balancing Resiliency and Performance by Selective Use of Degraded Writes and Spare Capacity in Storage Systems."

U.S. Appl. No. 16/918,654 filed in the name of Rivka Matosevich et al. filed Jul. 1, 2020, and entitled "Sharing Memory Resources Between Asynchronous Replication Workloads."

U.S. Appl. No. 16/983,423 filed in the name of Dan Aharoni et al. filed Aug. 3, 2020, and entitled "Deferred Reclamation of Invalidated Entries that are Associated with a Transaction Log in a Log-Structured Array."

U.S. Appl. No. 17/024,912 filed in the name of Anurag Sharma et al. filed Sep. 18, 2020, and entitled "Automatic Discovery and Configuration of Server Nodes."

U.S. Appl. No. 17/065,754 filed in the name of Dan Aharoni et al. filed Oct. 8, 2020, and entitled "Direct Response to IO Request in Storage System with Remote Replication."

U.S. Appl. No. 17/070,073 filed in the name of Dan Aharoni et al. filed Oct. 14, 2020, and entitled "Direct Response to IO Request in Storage System Having an Intermediary Target Apparatus."

U.S. Appl. No. 17/070,288 filed in the name of Anurag Sharma et al. filed Oct. 14, 2020, and entitled "Pipeline-Based System for Configuration Checking and Reporting Associated with an Information Processing System."

U.S. Appl. No. 17/071,407 filed in the name of John Moran et al. filed Oct. 15, 2020, and entitled "Dynamic Remediation Actions in Response to Configuration Checks in an Information Processing System."

U.S. Appl. No. 17/077,105 filed in the name of Yosef Shatsky et al. filed Oct. 22, 2020, and entitled "Volume Tiering in Storage Systems."

U.S. Appl. No. 17/106,988 filed in the name of Rivka Matosevich et al. filed Nov. 30, 2020, and entitled "Managing Host Connectivity to a Data Storage System."

U.S. Appl. No. 17/123,525 filed in the name of Itay Keller et al. filed Dec. 16, 2020, and entitled "Deferred Reclamation of Invalidated Entries Associated qith Replication in a Log-Structured Array."

* cited by examiner

200

300

REDISTRIBUTION OF PROCESSING GROUPS BETWEEN SERVER NODES BASED ON HARDWARE RESOURCE UTILIZATION

FIELD

This disclosure relates generally to data storage management techniques and, more specifically, to techniques for managing a log-structured data storage system.

BACKGROUND

State-of-the-art data storage systems are designed with the goal of enhancing storage efficiency and performance. For example, in some data storage systems, storage efficiency is enhanced by implementing in-line data compression to compress ingress data and store the compressed data to disk, thereby increasing disk storage utilization. While compression-enabled storage systems enhance storage utilization, there are problems associated with implementing in-line data compression in storage systems which are configured to perform "in-place-updates" of stored data where modified data is rewritten to the same storage location as the previous version. Such problems stem from the fact that the amount of compression achieved for a given block of data is dependent on the content of the data and, consequently, data compression generates compressed data of variable sizes. In this regard, when a certain piece of data is updated and rewritten to the same storage location, there is no guarantee that the compressed updated data will be able to fit in the same location on disk that was allocated to the older compressed data before the update. In other instances, the compressed updated data may be smaller in size than the older compressed data, leaving a "gap" in the storage space allocated to the data.

To address these issues, many compression-enabled storage systems implement a log-structured array (LSA) storage layout for storing compressed data. In an LSA layout, the disk storage space is divided into equal-sized blocks, referred to as "logs" or "log segments," into which compressed data is written. In an LSA storage system, whenever a user-offset is written, the data is written in a log entry in a log segment that has enough vacancy to host the data, wherein new data is placed in a new log entry that follows any pre-existing log entry in the log segment. The LSA storage system accommodates the size-change variability of compressed data since data is not allocated to a fixed storage location. Instead, when compressed data in an existing log entry is updated, an "out-of-place update" is performed to rewrite the updated compressed data into a new log entry, and the older existing data is invalidated.

SUMMARY

In some embodiments, an apparatus comprises a storage control system of a storage system. The storage control system comprises at least one processor coupled to memory. The at least one processor is configured to obtain measurement information comprising an indication of an amount of utilization of a hardware resource of a first server node by a plurality of processing groups assigned to the first server node and to determine that the amount of utilization of the hardware resource of the first server node is above a threshold amount of utilization based at least in part on the measurement information. The at least one processor is further configured to select a given processing group of the plurality of processing groups for redistribution based at least in part on the determination that the amount of utilization of the hardware resource of the first server node is above the threshold amount of utilization and on an amount of utilization of the hardware resource by the given processing group. The at least one processor is further configured to determine that a second server node comprises enough available capacity of the hardware resource to service the determined amount of utilization of the hardware resource by the given processing group and to redistribute the given processing group to the second server node based at least in part on the determination that the second server node comprises enough available capacity of the hardware resource to service the determined amount of utilization of the hardware resource by the given processing group.

These and other illustrative embodiments include, without limitation, apparatus, systems, methods and processor-readable storage media.

DETAILED DESCRIPTION

Exemplary embodiments will be described herein with reference to exemplary information processing systems which implement compression-enabled storage systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1A:
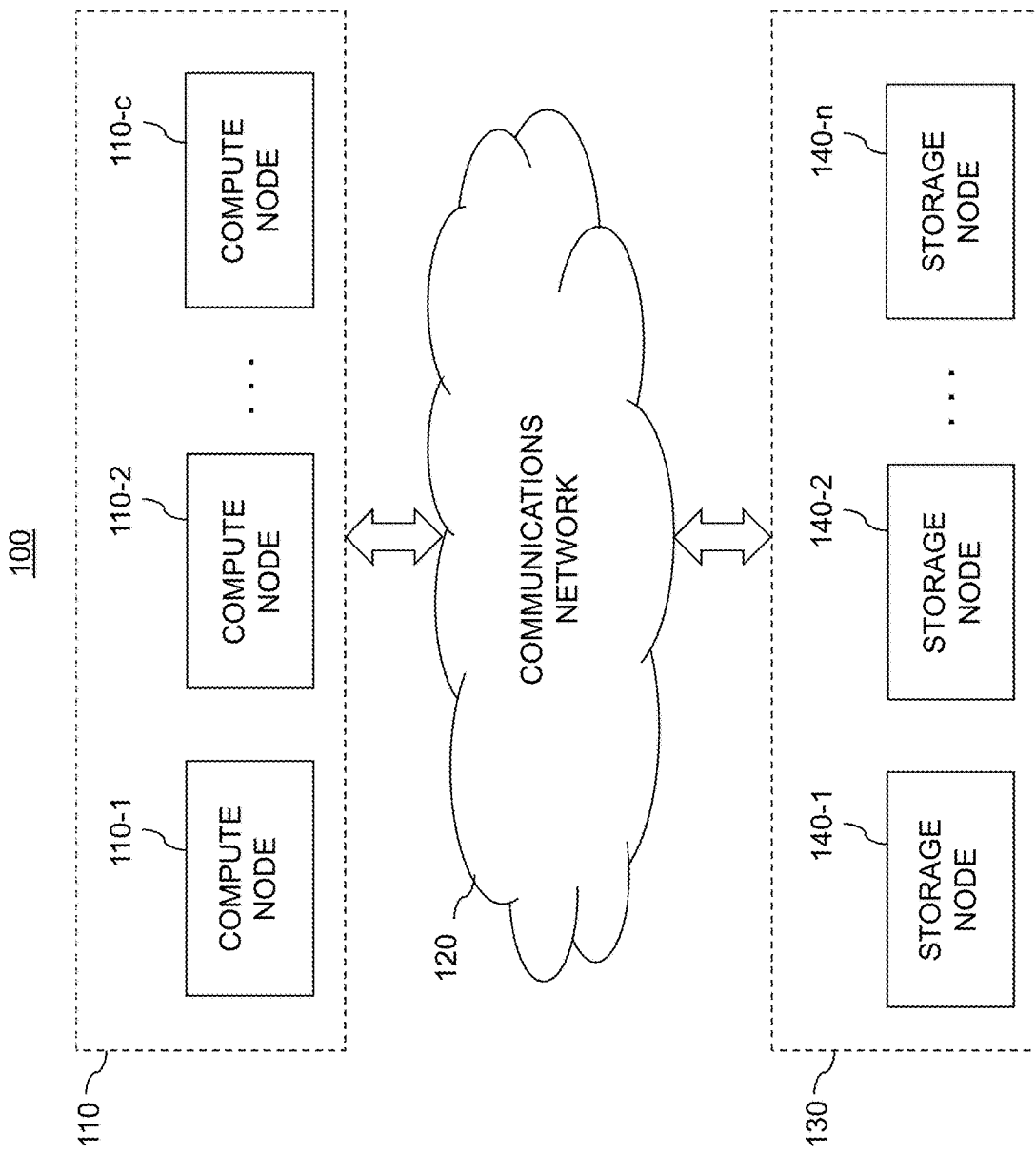
FIGS. 1A and 1B schematically illustrate an example information processing system comprising a storage system according to an exemplary embodiment of the disclosure.
Figure 1B:
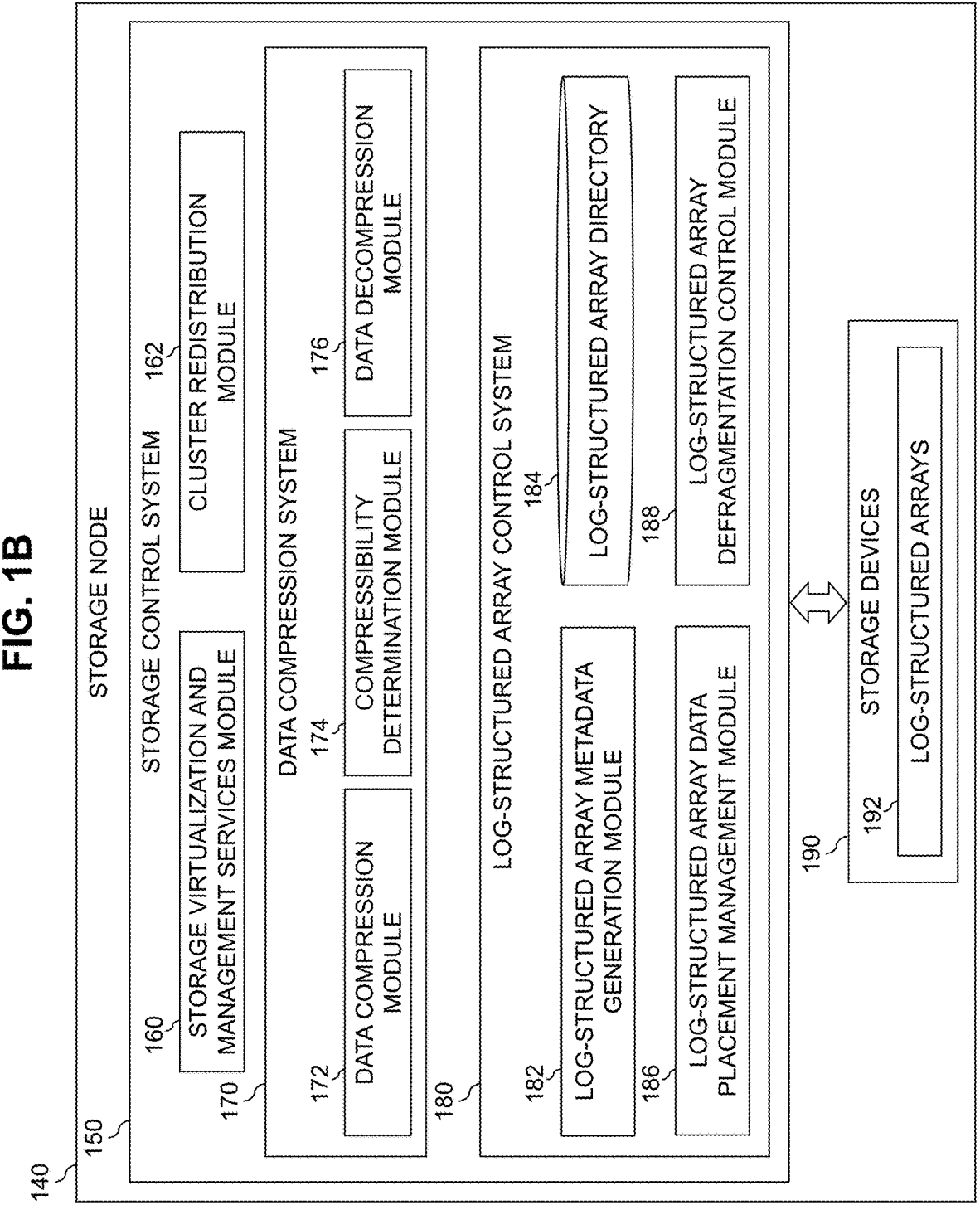

FIGS. 1A and 1B schematically illustrate an information processing system comprising a compression-enabled storage system according to an exemplary embodiment of the disclosure. More specifically, FIG. 1A schematically illustrates an information processing system 100 which comprises a plurality of compute nodes 110-1, 110-2, ..., 110-*c* (collectively referred to as compute nodes 110), a communications network 120, and a data storage system 130. The data storage system 130 comprises a plurality of storage nodes 140-1, 140-2, ..., 140-*n* (collectively referred to as storage nodes 140, or each singularly referred to as storage node 140). In the context of the exemplary embodiments described herein, the data storage system 130 comprises a compression-enabled data storage system which supports in-line compression of data that is stored in the storage media that is accessed and controlled by the storage nodes 140. FIG. 1B schematically illustrates an exemplary framework of at least one or more of the storage nodes 140.

In particular, as shown in FIG. 1B, the storage node 140 comprises a storage control system 150 and a plurality of storage devices 190 having storage capacity that is organized into a plurality of log-structured arrays 192. In general, the storage control system 150 implements data storage and management methods that are configured to, e.g., (i) divide the storage capacity of the storage devices 190 into storage pools and logical volumes, (ii) organize the storage capacity of one or more of the storage pools/volumes into an LSA storage architecture which comprises the plurality of log-structured arrays 192, and (iii) store compressed data and non-compressed data in predefined data block sizes (referred to as allocation unit size) in log segments of the log-structured arrays 192 according to an LSA data placement scheme.

To implement such functionalities, the storage control system 150 comprises a storage virtualization and management services module 160, a data compression system 170, and a log-structured array control system 180 (referred to hereafter as LSA control system 180). The data compression system 170 comprises a data compression module 172, a data compressibility determination module 174, and a data decompression module 176, the functions of which will be explained in further detail below. The LSA control system 180 comprises a log-structured array metadata generation module 182, a log-structured array directory 184, a log-structured array data placement management module 186, and a log-structured array defragmentation control module 188, the functions of which will be explained in further detail below. It is to be noted that the storage control system 150 may include additional modules and other components typically found in conventional implementations of storage controllers and storage systems, although such additional modules and other components are omitted for clarity and simplicity of illustration.

The compute nodes 110 illustratively comprise physical compute nodes and/or virtual compute nodes which process data and execute workloads. For example, the compute nodes 110 can include one or more server nodes (e.g., bare metal server nodes) and/or one or more virtual machines. In some embodiments, the compute nodes 110 comprise a cluster of physical server nodes or other types of computers of an enterprise computer system, cloud-based computing system or other arrangement of multiple compute nodes associated with respective users. In some embodiments, the compute nodes 110 include a cluster of virtual machines that execute on one or more physical server nodes.

The compute nodes 110 are configured to process data and execute tasks/workloads and perform computational work, either individually, or in a distributed manner, to thereby provide compute services such as execution of one or more applications on behalf of each of one or more users associated with respective ones of the compute nodes. Such applications illustratively issue input-output (I/O) requests that are processed by a corresponding one of the storage nodes 140. The term "input-output" as used herein refers to at least one of input and output. For example, I/O requests may comprise write requests and/or read requests directed to stored data of a given one of the storage nodes 140 of the data storage system 130.

The compute nodes 110 are configured to write data to and read data from the storage nodes 140 in accordance with applications executing on those compute nodes for system users. The compute nodes 110 communicate with the storage nodes 140 over the communications network 120. While the communications network 120 is generically depicted in FIG. 1A, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks.

In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein should be broadly constructed and not viewed as being limited to storage systems of any particular type or types. In some embodiments, the storage nodes 140 comprise storage server nodes (e.g., server node 600, shown in FIG. 6) having one or more processing devices each having a processor and a memory, possibly implementing virtual machines and/or containers, although numerous other configurations are possible. In some embodiments, one or more of the storage nodes 140 can additionally implement functionality of a compute node, and vice-versa. The term "storage node" as used herein is therefore intended to be broadly construed, and a storage system in some embodiments can be implemented using a combination of storage nodes and compute nodes.

In some embodiments, as schematically illustrated in FIG. 1B, the storage node 140 is a physical server node or storage appliance, wherein the storage devices 190 comprise DAS resources (internal and/or external storage resources) such as hard-disk drives (HDDs), solid-state drives (SSDs), Flash memory cards, or other types of non-volatile memory (NVM) devices such non-volatile random access memory (NVRAM), phase-change RAM (PC-RAM) and magnetic RAM (MRAM). These and various combinations of multiple different types of storage devices 190 may be implemented in the storage node 140. In this regard, the term "storage device" as used herein is intended to be broadly construed, so as to encompass, for example, SSDs, HDDs, flash drives, hybrid drives or other types of storage media. The storage devices 190 are connected to the storage node 140 through any suitable host interface, e.g., a host bus adapter, using suitable protocols such as ATA, SATA, eSATA, NVMe, SCSI, SAS, etc. In other embodiments, the storage node 140 can be network connected to one or more NAS nodes over a local area network.

The storage control system 150 is configured to manage the storage devices 190 and control I/O access to the storage devices 190 and/or other storage resources (e.g., DAS or NAS resources) that are directly attached or network-connected to the storage node 140. In some embodiments, the storage control system 150 is a component (e.g., storage data server) of a software-defined storage (SDS) system which supports the virtualization of the storage devices 190 by separating the control and management software from the hardware architecture. More specifically, in a software-defined storage environment, the storage control system 150 comprises an SDS storage data server that is configured to abstract storage access services from the underlying storage hardware to thereby control and manage I/O requests issued by the compute nodes 110, as well as to support networking and connectivity. In this instance, the storage control system 150 comprises a software layer that is hosted by the storage node 140 and deployed in the data path between the compute nodes 110 and the storage devices 190 of the storage node 140, and is configured to respond to data I/O requests from the compute nodes 110 by accessing the storage devices 190 to store/retrieve data to/from the storage devices 190 based on the I/O requests.

In a software-defined storage environment, the storage control system 150 is configured to provision, orchestrate and manage the local storage resources (e.g., the storage devices 190) of the storage node 140. For example, the storage control system 150 implements methods that are configured to create and manage storage pools (e.g., virtual pools of block storage) by aggregating capacity from the storage devices 190. The storage control system 150 can divide a storage pool into one or more volumes and expose the volumes to the compute nodes 110 as virtual block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In the software-defined storage environment, each of the storage nodes 140 in FIG. 1A can run an instance of the storage control system 150 to convert the respective local storage resources (e.g., DAS storage devices and/or NAS storage devices) of the storage nodes 140 into local block storage. Each instance of the storage control system 150 contributes some or all of its local block storage (HDDs, SSDs, PCIe, NVMe and flash cards) to an aggregated pool of storage of a storage server node cluster (e.g., cluster of storage nodes 140) to implement a server-based storage area network (SAN) (e.g., virtual SAN). In this configuration, each storage node 140 is part of a loosely coupled server cluster which enables "scale-out" of the software-defined storage environment, wherein each instance of the storage control system 150 that runs on a respective one of the storage nodes 140 contributes its local storage space to an aggregated virtual pool of block storage with varying performance tiers (e.g., HDD, SSD, etc.) within a virtual SAN.

In some embodiments, in addition to the storage control systems 150 operating as SDS storage data servers to create and expose volumes of a storage layer, the software-defined storage environment comprises other components such as (i) SDS data clients that consume the storage layer and (ii) SDS metadata managers that coordinate the storage layer, which are not specifically shown in FIG. 1A. More specifically, on the client-side (e.g., compute nodes 110), an SDS data client (SDC) is a lightweight block device driver that is deployed on each server node that consumes the shared block storage volumes exposed by the storage control systems 150. In particular, the SDCs run on the same servers as the compute nodes 110 which require access to the block devices that are exposed and managed by the storage control systems 150 of the storage nodes 140. The SDC exposes block devices representing the virtual storage volumes that are currently mapped to that host. In particular, the SDC serves as a block driver for a client (server), wherein the SDC intercepts I/O requests, and utilizes the intercepted I/O request to access the block storage that is managed by the storage control systems 150. The SDC provides the operating system or hypervisor (which runs the SDC) access to the logical block devices (e.g., volumes).

The SDCs have knowledge of which SDS control systems (e.g., storage control system 150) hold its block data, so multipathing can be accomplished natively through the SDCs. In particular, each SDC knows how to direct an I/O request to the relevant destination SDS storage data server (e.g., storage control system 150). In this regard, there is no central point of routing, and each SDC performs its own routing independent from any other SDC. This implementation prevents unnecessary network traffic and redundant SDS resource usage. Each SDC maintains peer-to-peer connections to every SDS storage control system 150 that manages the storage pool. A given SDC can communicate over multiple pathways to all of the storage nodes 140 which store data that is associated with a given I/O request. This multi-point peer-to-peer fashion allows the SDS to read and write data to and from all points simultaneously, eliminating bottlenecks and quickly routing around failed paths.

The SDS metadata manager components are deployed on multiple server nodes and operate in a manner which forms a tightly coupled cluster that is configured to supervise the operations of the storage cluster and manage storage cluster configurations. The SDS metadata managers operate outside of the data path and provide the relevant information to the SDS clients and storage servers to allow such components to control data path operations. The SDS metadata managers are configured to manage the mapping of SDC data clients to the SDS data storage servers. The SDS metadata managers manage various types of metadata that is required for system operation of the SDS environment such as configuration changes, managing the SDS data clients and data servers, device mapping, values, snapshots, system capacity including device allocations and/or release of capacity, RAID protection, errors and failures, and system rebuild tasks including rebalancing.

Regardless of the specific implementation of the storage environment, as noted above, the various modules of the storage control system 150 of FIG. 1B collectively provide data storage and management methods that are configured to, e.g., (i) divide the storage capacity of the storage devices 190 into storage pools and logical volumes, (ii) organize the storage capacity of the storage pools/volumes pools into the plurality of log-structured arrays 192, and (iii) store compressed data and non-compressed data in log segments of the log-structured arrays 192. In particular, the storage virtualization and management services module 160 implements any suitable logical volume management (LVM) system which is configured to create and manage local storage volumes by aggregating the storage devices 190 into one or more virtual storage pools that are thin-provisioned for maximum capacity, and logically dividing each storage pool into one or more storage volumes that are exposed as block devices (e.g., raw logical unit numbers (LUNs)) to the compute nodes 110 to store data.

In some embodiments, the storage pools are primarily utilized to group storage devices based on device types and performance. For example, SSDs are grouped into SSD pools, and HDDs are grouped into HDD pools. Furthermore, in some embodiments, the storage virtualization and management services module 160 implements methods to support various data storage management services such as data protection, data migration, data deduplication, replication, thin provisioning, snapshots, data backups, etc.

The data compression system 170 is configured to support in-line compression of data that is written to the LSA storage, and in-line decompression of compressed data that is read from the LSA storage. In particular, the data compression module 172 implements one or more types of data compression techniques to compress I/O write data that is provided with an I/O write request. For a write I/O operation, the associated I/O write data is divided into blocks, and each block is separately compressed by the data compression module 172. The data compression module 172 can implement one more data compression techniques including, but not limited to, Lempel-Ziv (LZ) compression, Lempel-Ziv-Welch (LZW) compression, other variants of LZ compression, Huffman encoding, run-length encoding, etc., and other types of data compression techniques which are suitable for the expected types of data that are to be stored for a given application.

The data decompression module 176 is configured to decompress compressed data that is read from the LSA storage in response to I/O read requests. In particular, when compressed data is accessed from the LSA storage, the compressed data is input to the data decompression module 176 and decompressed using a decompression process which corresponds to the process that was used to compress the data. The decompressed data is then returned in response to the I/O read request.

The compressibility determination module 174 is configured to determine the "compressibility" of data that is to be written to the LSA storage. With regard to a given block of I/O write data, the term "compressibility" as used herein broadly refers to (i) a level of data compression that can be obtained for the given block of I/O write data or (ii) a degree to which a size of the given block of I/O write data can be reduced by data compression. The data placement techniques implemented by the LSA control system 180 are based, in part, on the understanding that not all data is compressible. For example, when data compression is performed on data that is essentially incompressible, the size of the resulting "compressed" data may be the same or greater than the size of the original, non-compressed data. For example, incompressible data can include pre-compressed content (e.g., compressed audio and video), or pure random data.

The compressibility of I/O write data can be determined in various ways. For example, in some embodiments, any compression product that yields a size which is greater than some predefined size threshold T is deemed, in effect, to be incompressible:

$$IsCompressible(\text{data}) = \begin{cases} \text{TRUE}, & \text{size(compress(data))} \leq T \\ \text{FALSE}, & \text{otherwise} \end{cases}$$

In other embodiments, the compressibility of I/O write data can be determined by (i) computing a "compressibility value" as a function of a size of the I/O write data and a size of the compressed I/O write data, and (ii) comparing the computed "compressibility value" to a predefined "compressibility threshold value" to determine whether a level of data compression of the compressed I/O write data meets or exceeds a target minimum level of data compression. For example, in some embodiments, a compressibility value of I/O write data can be expressed in terms of a compression ratio R value, which is computed as a ratio of the size of the original (non-compressed) I/O write data to the size of the compressed I/O write data, as follows:

$$CompressionRatio(\text{data}): R = \frac{\text{size(data)}}{\text{size(compress(data))}}$$

For example, a data compression process which compresses data from a size of 20 Kilobytes (KB) to a size of 4 KB yields a compression ratio R of 20/4=5, or a ratio of 5:1. In this instance, any compression product that yields a compression ratio R which is greater than or equal to a predefined compression ratio threshold $R_{Threshold}$ can be deemed compressible, while any compression product that yields a compression ratio R which is less than the predefined compression ratio threshold $R_{Threshold}$ is deemed, in effect, to be incompressible. In some embodiments, the compression ratio threshold $R_{Threshold}$ may be 1.25. In this embodiment, the compression ratio threshold $R_{Threshold}$ is an exemplary "compressibility threshold value."

In other embodiments, the compressibility of I/O write data can be determined based on a computation of a compressibility value C, where $$C = 1/R = \frac{\text{size(compress(data))}}{\text{size(data)}}.$$

For example, assuming the data compression process results in the reduction of the size of data from 20 KB to 4 KB, the computation of the compressibility value C=4/20, yields of value of 0.2. The compressibility value C can be compared to a predefined compressibility threshold value $C_{Threshold}$ to determine if a given block of data is deemed compressible or incompressible. For example, in some embodiments, an exemplary compressibility threshold value is set to $C_{Threshold}$=0.8 (which corresponds to a compression ratio R=1.25). In this instance, any compression product that yields a compressibility value C which is less than or equal to $C_{Threshold}$ is deemed compressible, while any compression product that yields a compressibility value C which is greater than $C_{Threshold}$ is deemed, in effect, to be incompressible.

In other embodiments, a "compressibility value" for I/O write data can be expressed in terms of a space savings value S, which represents a reduction in the size of the compressed I/O write data relative to the non-compressed size of the I/O write data. In particular, the space savings value S is computed as follows:

$$SpaceSavings(\text{data}): S = 1 - \left(\frac{size(compress(\text{data}))}{size(\text{data})}\right)$$

For example, assuming a data compression process results in the reduction in the size of I/O write data from 20 KB to 4 KB, the computation of S=1−(4/20) yields a space savings value S of 0.8 (or 80%). The space savings value S can be compared to a predefined space savings threshold value $S_{Threshold}$ to determine if a given block of data is deemed compressible or incompressible. For example, in some embodiments, an exemplary space savings threshold value is set to $S_{Threshold}$=0.2 (which corresponds to $C_{Threshold}$=0.8 or $R_{Threshold}$=1.25). The value of $S_{Threshold}$=0.2 corresponds to at least a 20% reduction in the size of the compressed I/O write data relative to the non-compressed size of the I/O write data. In this instance, any compression product that yields a space savings value S which is greater than or equal to $S_{Threshold}$ is deemed compressible, while any compression product that yields a space savings value S which is less than $S_{Threshold}$ is deemed, in effect, to be incompressible. In this embodiment, the space savings threshold value $S_{Threshold}$ is an exemplary "compressibility threshold value."

Figure 2:
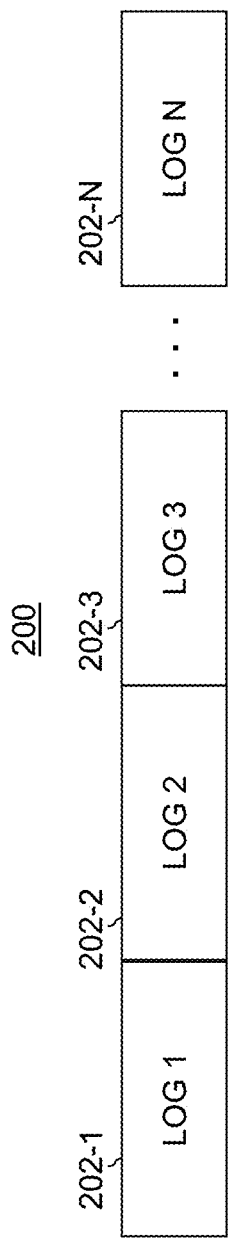
FIG. 2 schematically illustrates an example log-structured array that may store compressed and uncompressed data according to an exemplary embodiment of the disclosure.

In general, LSA control system 180 creates and manages the log-structured arrays 192 within the storage pools/volumes of the storage devices 190. For example, FIG. 2 illustrates a log-structured array 200 which can be created and utilized by the LSA control system 180 to store compressed and uncompressed data. The log-structured array 200 comprises an array of N log segments 202-1, 202-2, 202-3, . . . , 202-N (collectively, or individually referred to as log segments 202, or logs 202). In some embodiments, the log-structured array 200 is implemented in one or more block storage devices, wherein each block storage device comprises a physical storage space divided into a plurality of logical data blocks (e.g., fixed-size allocation units), wherein the logical data blocks each comprise a separately addressable unit of the physical storage space with a specified block size (e.g., allocation unit size). Each logical data block (e.g., allocation unit) comprises a same number of one or more physical data blocks of the underlying storage media.

In the LSA layout, each log segment 202 of the log-structured array 200 comprises a set of contiguous logical data blocks of the physical storage space. The log segments 202 can reside in the same block device or be distributed over multiple block devices, depending on the configuration of the block storage devices. In some embodiments, the log segments 202 are equal in size (e.g., the log segments 202 each include the same number of logical data blocks). For example, assuming that each logical block (e.g., cluster of sectors on HDD, or page of SSD) is 4 KB, and that each log segment 202 has a segment size of 256 KB, then each of the N log segments 202 comprises a consecutive sequence of 64 logical data blocks within the LSA storage space.

Whenever a user-offset is written to a logical block address, the data is placed in a given log segment 202 which has enough vacancy to host the data. For example, when new data is written to LSA storage, the new data is appended to the end of a given log segment 202 which has sufficient room. In addition, metadata updates comprising log indexing information and other types of metadata are also appended to the given log segment 202 when data is written to the given log segment 202. In this regard, each log segment 202 will include a sequence of appended data entries comprising blocks of data and blocks of indexing metadata. Furthermore, when a modified data block comprising non-compressed data is re-written to LSA storage, the modified data block may be written to the same log entry location(s) as the original data (referred to as "in-place update"). On the other hand, when a modified data block comprising compressed data is rewritten to the LSA storage, the modified data may be written to one or more new log entry locations in a log segment which has vacancy (referred to as "out-of-place update"), wherein an out-of-place update invalidates the original compressed data that is held in one or more existing log entries. In some cases, modifications for both uncompressed and compressed data may be written to one or more new log entry locations in a log segment which has vacancy, e.g., out-of-place updates may be utilized for modifications to both uncompressed and compressed data.

The log-structured array metadata generation module 182 (hereafter referred to as LSA metadata generation module 182) is configured to generate log metadata that is included in metadata log entries that are appended to data entries in the log segments of the log-structured arrays 192. The log metadata entries comprise indexing information (e.g., pointers) that is included within the log segment to provide fast random access to data entries within the log segments, as well as information that describes the data entries (e.g., valid, not valid, compressed, uncompressed, etc.) within the log segment, and other information such as checksums for error detection, etc. The type of information and data structures that are used to implement the log metadata will vary depending on the application. For example, in some embodiments, the log metadata can be implemented using hash table data structures, B-tree data structures, bitmaps, linked-lists, or other suitable data structures for organizing the log indexing information.

The log-structured array directory 184 (hereafter referred to as LSA directory 184) stores mapping information which maps logical block addresses to physical block addresses of log entries within the log-structured arrays 192. In some embodiments, the LSA directory 184 is maintained in non-volatile system memory. In some embodiments, the logical block addresses of logical devices are mapped to physical data entries in the log-structured array 192. The LSA directory 184 provides information that maps each logical block address to a current block location in the log-structured arrays 192. For example, an entry in the LSA directory 184 for a given logical block provides the physical ID and location of the log segment which stores the logical block, the starting location in the log segment (offset) and length in physical device units (e.g., sectors) to which the logical block is mapped. The LSA directory 184 can be implemented using any suitable type of directory data structure and directory implementation algorithm. For example, in some embodiments, the LSA directory 184 can implement a hash table which comprises key-value pairs, as is known in the art. In some embodiments, the directory information within the LSA directory 184 is used to determine the location of a given log segment that holds the data of a given logical block, while the metadata indexing entries within the given log segment are utilized to determine the location of the corresponding data within the log segment.

The log-structured array data placement management module 186 (hereafter, referred to as LSA data placement management module 186) implements methods for storing both compressed and non-compressed data entries within log segments of the log-structured arrays 192 in a way that minimizes I/O amplification (e.g., read amplification and write amplification) and enhances overall data access and management efficiency. The term "I/O amplification" refers to a broad set of circumstances in which an I/O request triggers multiple, undesirable I/O operations (e.g., the file system needs to perform multiple I/O operations to successfully service the initial I/O request). For example, a "read-modify-write" is one type of write operation that leads to I/O amplification because such write operation requires performing a read operation to read an entire logical data block (allocation unit) of existing data, modifying a portion of the data within the logical data block, and then rewriting the entire logical data block with the modified data back to disk. The "read-modify-write" process increases both read and write amplification due to the need to read extra data that is not the target of the I/O write request, and then rewrite such extra (unmodified) data along with the modified data back to disk.

The log-structured array defragmentation control module 188 (hereafter referred to as LSA defragmentation control module 188) implements methods for defragmenting log segments within the log-structured arrays 192. The physical location of data within log segments of the log-structured arrays 192 will change over time as a result of out-of-place writes that are performed by the LSA data placement management module 186 when writing modified blocks of compressed data to new log entries that are appended to the end of a given log segment. The out-of-place writes result in invalid blocks of data which cannot be reused until they are reclaimed. In addition, due to the runtime variation of data compressibility, some or all data entries that contain compressed data can have unused storage space that remains after filling the data entries with compressed data. The invalid data entries (and their corresponding metadata entries) together with the unused space in data entries with compressed data collectively form "gaps" in the log segments. The LSA defragmentation control module 188 periodically performs a defragmentation process to consolidate such "gaps" into free storage space within the log segments that can be used to store new data.

Figure 3:
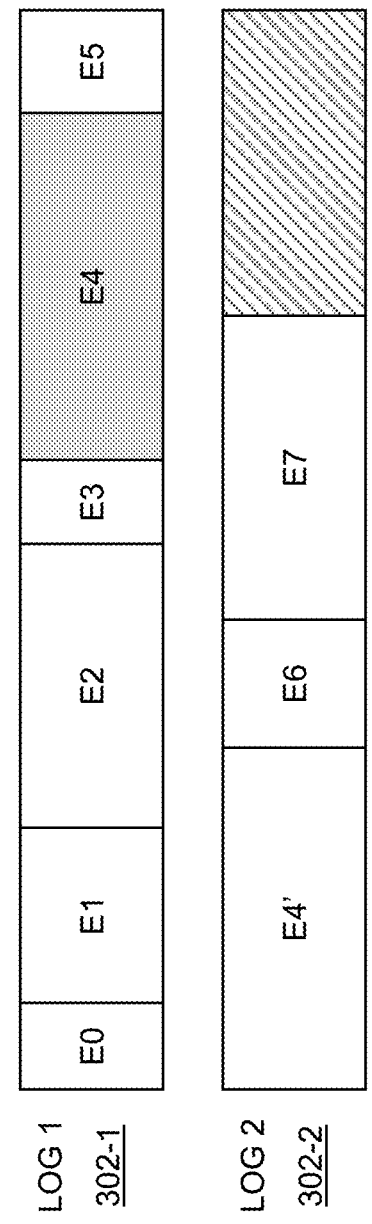
FIG. 3 schematically illustrates an example log-structured array comprising multiple log segments, and a conventional data placement process for storing compressed data in log entries of the log segments.

In a conventional compression-enabled storage system which utilizes an LSA storage architecture to store compressed data, whenever a user-offset is written, the compressed data is placed into a log segment that has enough vacancy to host the compressed data. In particular, the new data is placed into a new log entry that is appended to the last log entry of the log segment. For example, FIG. 3 schematically illustrates a log-structured array comprising multiple log segments, and a conventional process for storing compressed data into log entries of the log segments. In particular, FIG. 3 illustrates a log-structured array 300 comprising a plurality of log segments (or logs) including a first log segment 302-1 (LOG 1) and a second log segment 302-2 (LOG 2), wherein each log segment 302-1 and 302-2 comprises a plurality of log data entries, generally denoted E(i).

In particular, the first log segment 302-1 comprises log data entries E0, E1, E2, E3, E4, and E5, and the second log segment 302-2 comprises log data entries E4', E6, and E7. The log data entries E(i) are shown to have variable sizes as the log data entries store compressed data. For ease of illustration, the metadata descriptors of the log data entries are not shown. The shaded region of the first log segment 302-1 represents a region with invalid (stale) data, and the striped region within the second log segment 302-2 represents a "logically" vacant region (e.g., logical data blocks that are vacant and can be used to store new data entries).

FIG. 3 illustrates a state in which the compressed data of the log data entry E4 in the first log segment 302-1 has been updated and rewritten into the second log segment 302-2 as log entry E4'. In this instance, the log data entry E4 is no longer valid, thus resulting in a "gap" in the first log segment 302-1.

In a conventional LSA storage system which stores compressed data, whenever a user-offset is rewritten (e.g., the log entry E4 of the first log segment 302-1 is rewritten to the new log entry E4' in the second log segment 302-2), no effort is made to fit the new data into the location (log entry) of the older data. Instead, an out-of-place write is performed to store the updated/modified data in the next available log that has sufficient vacancy to hold the new data, similar to a new write. This allows the LSA storage system to accommodate the size-change variability of compressed data since data is not allocated to a fixed storage location. As noted above, due to the continued creation of invalid log entries over time, the LSA layout requires maintenance defragmentation cycles to close "gaps" in the storage space which result from the invalid entries.

A defragmentation process involves rewriting a large portion of a log segment, or the entire log segment, after packing the valid log data entries together, such that all gaps in the log segment are closed, and all vacant regions of the log segment become contiguous. The implementation of the LSA layout, together with the necessity to have defragmentation cycles, imposes new challenges with regard to certain types of storage media in which write amplification enhances the gradual wearing of the storage devices, ultimately rendering the devices unusable. This is the case with SSD storage media, which are becoming increasingly popular because of their superior access times as compared to magnetic disks. The write operations involved in the defragmentation cycles, where the same data is rewritten just for the sole purpose of maintenance, constitutes undesirable write amplification.

As mentioned above, metadata is utilized to determine data placement. In some implementations, each metadata entry corresponds to a large block of data, e.g., 1 GB of data. Such an implementation allows for features such as capacity allocation and thin provisioning. In some implementations, each metadata entry corresponds to a smaller block of data, e.g., 4 KB to 16 KB. Such an implementation may be utilized, for example, in a system that provides compression and deduplication where, for example, the finer granularity provides for greater deduplication. Smaller block sizes also have additional advantages in scenarios where snapshots are used since a snapshot may diverge from the original volume at fine granularity.

When such implementations use LSAs, for example, as described above, several potential performance problems may be avoided or inhibited. For example, reduced performance due to the servicing of random writes may be avoided by grouping the random writes into a single large write with metadata being used to read back the content of such composite blocks. Reduced performance of small updates to the parity RAID may be avoided or inhibited by such grouping. By grouping smaller writes into larger writes, the LSA allows the storage system to convert small user writes into full-stripe writes which may result in increased performance.

One tradeoff of using an LSA is that continuous addresses in a volume may be spread out over many physical locations. Likewise, a single physical chunk will contain data from many offsets from many volumes. This may lead to a dependency between otherwise unrelated data and metadata which may introduce some additional considerations when the cluster rebalances its processing, such as when new server nodes are added to the cluster. For example, moving the processing for a range of addresses from one server node to another server node in the cluster may require a separation of the data and the metadata of the range of addresses that is moving from a range of addresses that is not being moved.

In some embodiments, scalability and flexibility of processing distribution may be achieved by assigning related data and metadata into silos, referred to herein as processing groups, where each processing group is independent of the other processing groups. Each of these processing groups can be placed on and migrated to any server node on the cluster. The association of a particular host write operation to a processing group may, for example, be based on the write operation's address or hash. An address-based association may define address ranges for each processing group while a hash-based association defines hash value ranges for each processing group. In some embodiments, both schemes may perform processing group allocation based on a quantity of processing groups per server node. In some embodiments, the processing groups are defined to be large enough so that random writes can still be joined to a full stripe write, as described above, within each processing group. In some embodiments, the number and size of the processing groups may be large enough to be spread out over the server nodes in a manner that is reasonably balanced.

In an architecture that uses local storage and processing, e.g., each server node performs the processing and then stores the data on its own local devices, the distribution of the processing groups is dictated by available capacity. However, in a disaggregated architecture that stores the data on devices independently from the server node that performs the processing, there is much more that can be done to optimize the utilization of the processing resources.

Utilizing processing groups in a disaggregated architecture may provide both advantages and challenges. For example, even though in an average use case the processing groups are of comparable size, it may be possible in some cases that one or more processing groups become bloated in relation to the other processing groups.

In one example scenario, a series of snapshots that are overwritten in an address that maps to the same processing group may significantly increase the size of that processing group as compared to an average processing group that has not been snapshotted.

In another example scenario, when the number of addresses covered by all of the processing groups is even, there is no guarantee that the required processing resources themselves are even. For example, if the data from a first processing group is read much more often than the data in a second processing group, the server node hosting the first processing group may become overloaded while the server node hosting the second processing group will remain underutilized. The fact that the focus of the workload may shift over time may also add to this potential issue as well since a static solution would not cover such a shift.

In software defined environments, the resources such as, e.g., the CPU, RAM, LAN, persistent memory, etc., that are available to each server node may not be the same. In cases where the resources of each server node are not the same or similar, distributing the processing groups evenly over all of the server nodes may be inefficient and wasteful since some of those server nodes can handle more load on a given type of resource than the other server nodes. In one example scenario, a first server node may comprise more of one resource than a second server node. In another example, the first server node may also comprise less of another resource than the second server node. For example, the first server node may comprise more CPU capability than the second server node but less RAM than the second server node. In some cases, a server node may even lack a particular resource altogether, such as, e.g., persistent memory. Because of these differences between the resources of the server nodes, a solution that evenly distributes the processing groups among the server nodes simply based on the address or hash may not be fully optimized for highly scalable or software defined systems.

Figure 4:
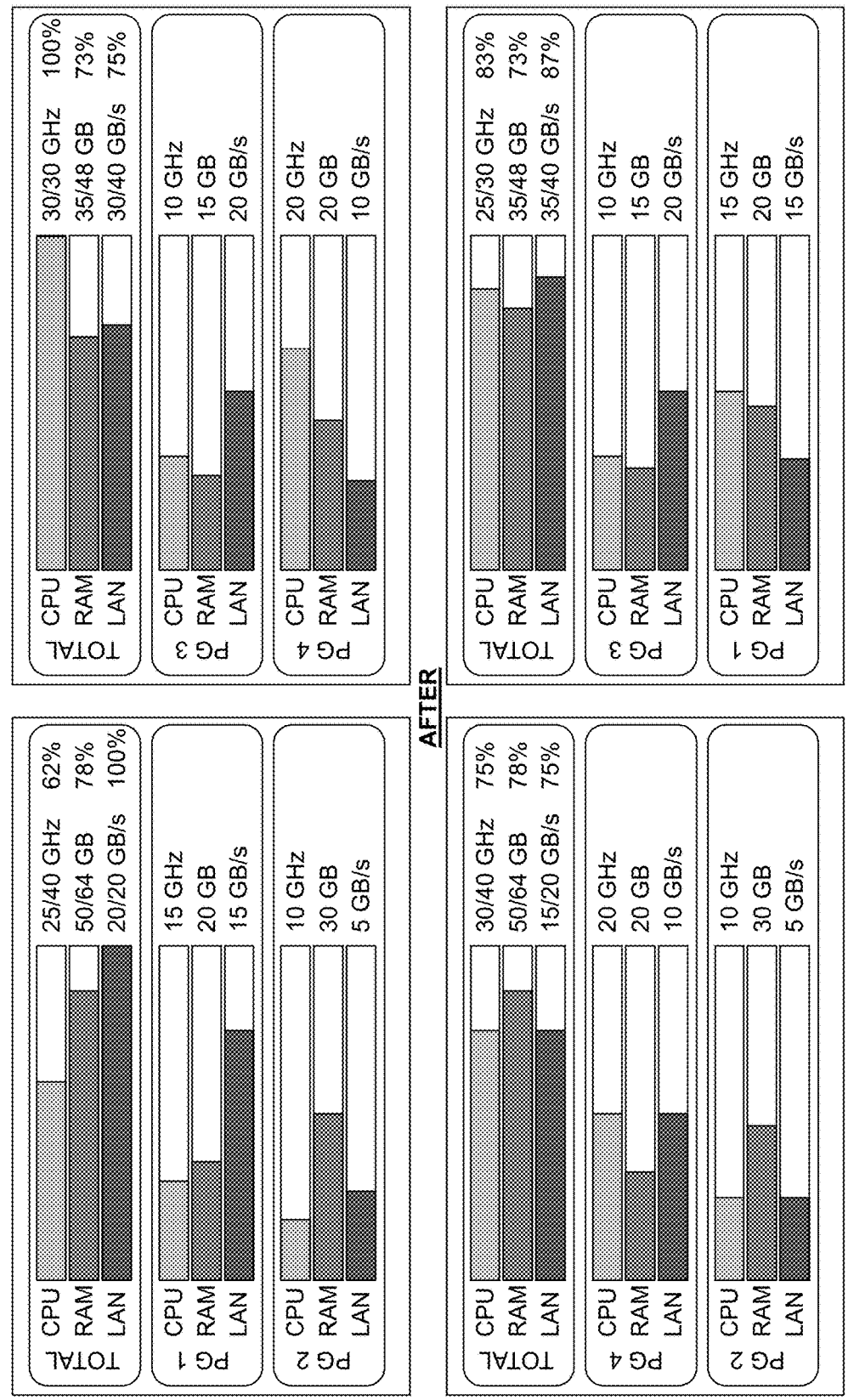
FIG. 4 illustrates a diagram of an example scenario according to an exemplary embodiment of the disclosure.

With reference to FIGS. 1B and 4, in illustrative embodiments, storage control system 150 comprises a cluster redistribution module 162 that is configured to manage the distribution of the processing groups among the server nodes. Cluster redistribution module 162 comprises functionality that implements a processing-oriented approach to the distribution of the processing groups as compared to the capacity-oriented approaches described above. In illustrative embodiments, cluster redistribution module 162 utilizes a resource-based criterion to determine a processing group's preferred placement on the server nodes.

By utilizing a processing-oriented approach, the cluster redistribution module 162 improves the efficiency of the usage of the server nodes of the storage system. For example, cluster redistribution module 162 breaks down the computing power of each server node of the storage system into multiple resources, e.g., CPU capability, memory, persistent memory, network bandwidth or other hardware resources of the server nodes. In addition, the resource usage of each processing group is also broken down into the same categories. These resources are measured by the cluster redistribution module 162 on a per server node basis to determine which resource or resources if any are causing bottlenecks on the server nodes. The resources are also measured by the cluster redistribution module 162 on a per processing group basis to determine each processing group's contribution to the load on each resource for each server node. When a bottleneck is identified on one or more of the server nodes, one or more of the corresponding processing groups that are assigned to that server node may be redistributed to one or more of the other server nodes based on the measured resources of those processing groups and also the measured and available resources of that server node and the other server nodes.

In some cases, the processing groups of multiple server nodes may be redistributed as needed to ensure that the occurrence of bottlenecks on the server nodes is reduced as much as possible or even entirely removed. One example redistribution may comprise, for example, swapping processing groups between server nodes. Another example redistribution may comprise moving a processing group from a first server node to a second server node, moving another processing group from the second server node to a third server node and moving yet another processing group from the third server node to the first server node. Any other redistribution of the processing groups between the server nodes by the cluster redistribution module 162 may be utilized. In some cases, a proximity of one server node to another may also be utilized as a factor in the redistribution.

As mentioned above, the measurement of the resources is performed at two levels, per processing group and per server node. This measurement information is obtained by one or more cluster redistribution modules 162 that are configured with functionality to balance the processing groups per server node and across all server nodes. The cluster redistribution module 162 utilizes the measurement information to determine how overloaded each server node is, which processing group or groups need to be redistributed from the overloaded server nodes and which server node or server nodes are preferred as destinations for those processing groups that need to be redistributed. The cluster redistribution module 162 functionality may be performed in one step or more than one step where, for example, it may determine that multiple processing groups across a variety of server nodes need to be redistributed among the server nodes.

Cluster redistribution module 162 may perform the cluster redistribution in a variety of ways. In a first example embodiment, cluster redistribution module 162 may comprise a sorted list of processing groups per resource per server node. The cluster redistribution module 162 may be configured to monitor the usage of each resource for each server node and determine whether or not the usage of any of the resources for a given server node exceeds a threshold amount of the capacity of the server node for that resource, e.g., 70%, 80%, 90% or any other threshold amount. In the event that the usage a particular resource exceeds the threshold amount for that resource on a given server node, one or more of the processing groups for that resource may be relocated by the cluster redistribution module 162 to a server node that has sufficient capacity for that resource. In some embodiments, the most demanding processing group for that resource may be relocated by the cluster redistribution module 162 to the server node that has the lowest utilization of that resource if possible.

In a second example embodiment, the cluster redistribution module 162 may be configured to also factor in the other resources. This may be accomplished by utilizing a vector $\vec{U}$ per processing group where each resource is a component in the vector $\vec{U}$ for that processing group. In addition, the cluster redistribution module 162 utilizes a vector $\vec{N}_t$ per node where each resource is a component of the vector $\vec{N}_t$ for that server node. In such an embodiment, the cluster redistribution module 162 is configured to compute a summation vector $\vec{S}_t = \vec{N}_t + \vec{U}$ and choose the summation vector $\vec{S}_t$ for which none of the components are greater than 100% utilization and $|\vec{S}_t|$ is minimal.

In a third example embodiment, cluster redistribution module 162 may calculate the summation vector $S_i$ for all processing groups $\vec{U}_t$ and all nodes $\vec{N}_t$ thereby increasing accuracy in exchange for an increase in the complexity to O(i+j).

Cluster redistribution module 162 may also or alternatively implement various other processes for balancing the redistribution of the processing groups among the server nodes in other embodiments.

Utilizing the techniques described above, cluster redistribution module 162 measures the usage of each resource individually, determines on a per server node basis which resource is a bottleneck and redistributes a processing group from a server node that has a high consumption of the overutilized resource to a server node that has a lower consumption of that resource.

An example scenario utilizing these techniques and processes will now be described with reference to FIG. 4. As shown in the example scenario of FIG. 4, server node 1 comprises 20 TB of storage capacity, 40 GHz of CPU capacity, 64 GB of RAM and 20 GB/s of LAN bandwidth while server node 2 comprises 25 TB of storage capacity, 30 GHz of CPU capacity, 48 GB of RAM and 40 GB/s of LAN bandwidth. As shown in FIG. 4, a processing group is denoted as "PG."

In the example scenario of FIG. 4, processing groups 1 and 2 have been assigned to server node 1 while processing groups 3 and 4 have been assigned to server node 2 before any balancing is performed by cluster redistribution module 162. Cluster redistribution module 162 measures the resource usage to obtain measurement information about the server nodes and their assigned process groups for each resource.

The measurement information for server node 1 shows that processing group 1 utilizes 15 GHz of CPU, 20 GB of RAM and 15 GB/s of LAN bandwidth and processing group 2 utilizes 10 GHz of CPU, 30 GB of RAM and 5 GB/s of LAN bandwidth. As can be seen in FIG. 4, the total usage for server node 1, based on the usage of processing groups 1 and 2, is 25/40 GHz of CPU (62%), 50/64 GB of RAM (78%) and 20/20 GB/s of LAN bandwidth (100%).

The measurement information for server node 2 shows that processing group 3 utilizes 10 GHz of CPU, 15 GB of RAM and 20 GB/s of LAN bandwidth and processing group 4 utilizes 20 GHz of CPU, 20 GB of RAM and 10 GB/s of LAN bandwidth. As can be seen in FIG. 4, the total usage for server node 2, based on the usage of processing groups 3 and 4, is 30/30 GHz of CPU (100%), 35/48 GB of RAM (73%) and 30/40 GB/s of LAN bandwidth (75%).

Based on this measurement information, cluster redistribution module 162 determines that the LAN usage of 100% for server node 1 exceeds a threshold amount of LAN usage, e.g., 90%. Cluster redistribution module 162 may also determine that the CPU usage of 100% for server node 2 exceeds a threshold amount of CPU usage, e.g., 90%.

In the first example embodiment described above, cluster redistribution module 162 would then determine that processing group 1 is the processing group on server node 1 with the highest amount of LAN usage at 15 GB/s, select processing group 1 for redistribution and redistribute processing group 1 to the server node with the lowest amount of LAN usage. Similarly, cluster redistribution module 162 may also determine that processing group 4 is the processing group on server node 2 with the highest amount of CPU usage at 20 GHz, select processing group 4 for redistribution and redistribute processing group 4 to the server node with the lowest amount of CPU usage.

In some embodiments cluster redistribution module 162 may also ensure that the destination server node has sufficient capacity to handle the resources of the redistributed processing groups in addition to the resource usage of any processing groups that are already assigned to that server node without exceeding the corresponding threshold amounts of usage for those resources for that server node.

In the second example embodiment described above, cluster redistribution module 162 may generate the vector of resources for each of the processing groups 1, 2, 3 and 4 and each of server nodes 1 and 2 to determine the preferred destination for a given processing group. For example, as seen in FIG. 4, the vectors may indicate that a swap of units 1 and 4 between server nodes 1 and 2 results in usage levels that are below the threshold amounts for each resource for each server node.

For example, as seen in FIG. 4, after the redistribution, the measurement information for server node 1 shows that processing group 4 utilizes 20 GHz of CPU, 20 GB of RAM and 10 GB/s of LAN bandwidth and processing group 2 utilizes 10 GHz of CPU, 30 GB of RAM and 5 GB/s of LAN bandwidth. As can be seen in FIG. 4, the total usage for server node 1 after the redistribution, based on the usage of processing groups 4 and 2, is 30/40 GHz of CPU (75%), 50/64 GB of RAM (78%) and 15/20 GB/s of LAN bandwidth (75%).

In addition, after the redistribution, the measurement information for server node 2 shows that processing group 3 utilizes 10 GHz of CPU, 15 GB of RAM and 20 GB/s of LAN bandwidth and processing group 1 utilizes 15 GHz of CPU, 20 GB of RAM and 15 GB/s of LAN bandwidth. As can be seen in FIG. 4, the total usage for server node 2 after the redistribution, based on the usage of processing groups 3 and 1, is 25/30 GHz of CPU (83%), 35/48 GB of RAM (73%) and 35/40 GB/s of LAN bandwidth (87%).

In this manner, processing groups have been redistributed by the cluster redistribution module 162 such that the bottlenecks to the LAN bandwidth of server node 1 and the CPU of server node 2 are alleviated.

In some embodiments, another factor that may be integrated into the selection of a destination server node for distribution is the proximity of the processing group to its interfacing host devices. For example, in some cases the data in an address range may often be written to or read from by the same host device. With the flexibility in processing group placement provided by the cluster redistribution module 162, it is possible for the cluster redistribution module 162 to favor redistribution or assignment of the processing groups to the server node or nodes to which the host device is sending the data. In some cases, a proximity to other interfaces may also be considered in a factor for the distribution of the processing groups by the cluster redistribution module 162 including, for example, proximity to persistent memory, proximity to high-speed storage devices that serve as a cache or proximity to other interfaces, where the proximity may be measured using a time to access or a number of resources spent to access.

The use of the cluster redistribution module 162 is especially suitable to a disaggregated architecture in which location of the data is independent of the location of the processing groups because redistribution of the processing groups does not entail any data movement. Even so, the redistribution of processing groups may not be instantaneous. For example, depending on the implementation, such a redistribution may require operations such as, e.g., flushing cached data, quiescing the I/O operations to the processing group, loading metadata to RAM at the new destination server node and updating distribution tables. While these operations are much cheaper than moving data, excessive amounts of redistribution may induce a performance impact on the storage system. For example, it may not be beneficial for a processing group with a high fluctuation rate of resource utilization to be continuously relocated. In such cases, cluster redistribution module 162 may measure the average utilization of the resources by the processing groups over a period of time, e.g., seconds, minutes or any other period of time. Once a stable average measurement is achieved, the cluster redistribution module 162 may select the processing group for redistribution if the expected gain in resource reduction is sufficiently large, e.g., a 10% gain.

Since cluster redistribution module 162 provides the storage system with the ability to match and redistribute processing groups to appropriate server nodes based on the usage of one or more resources, the size of the processing groups is less relevant and the workload is instead shifted between the server nodes as needed based on the specific resource consumption of each processing group in conjunction with the diversified capabilities of the various server nodes in the cluster. Such resource-based redistribution provides performance gains over a simple redistribution of the processing groups evenly among the server nodes.

Figure 5:
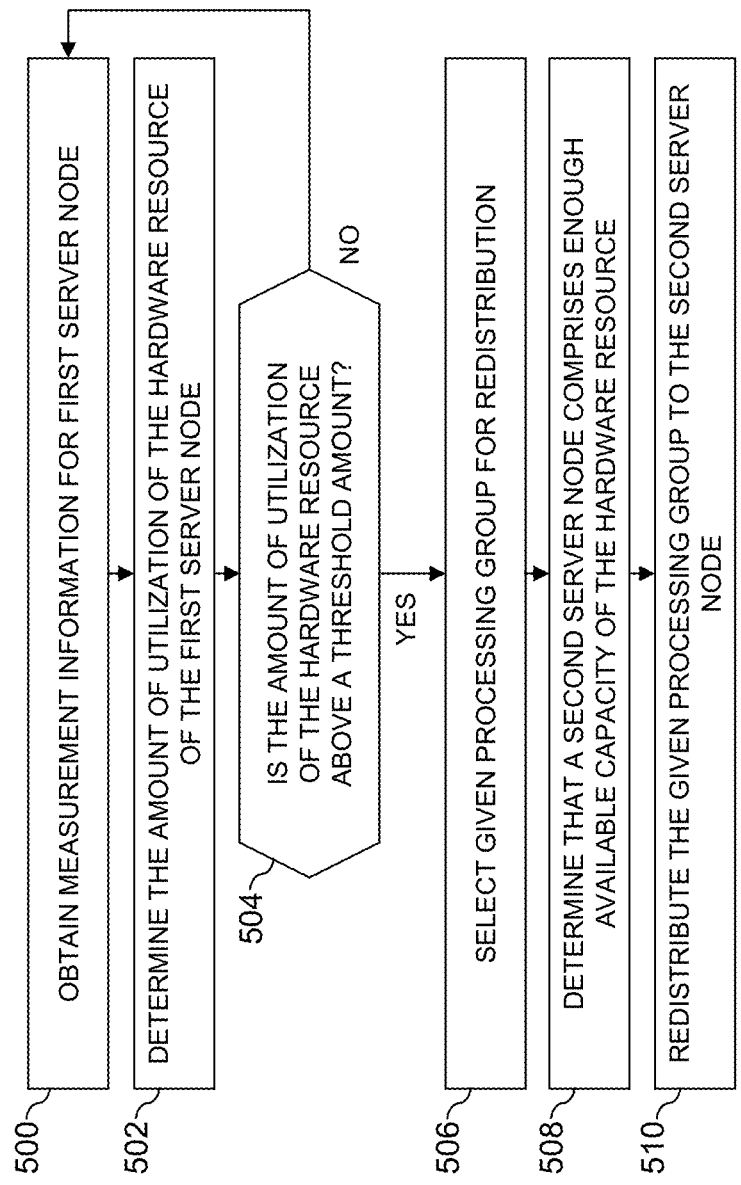
FIG. 5 is a flow diagram of an example process for redistributing processing groups according to an exemplary embodiment of the disclosure.

FIG. 5 is a flow diagram of a process for redistributing processing groups according to an exemplary embodiment of the disclosure. The process as shown in FIG. 5 includes steps 500 through 510. For purposes of illustration, the process flow of FIG. 5 will be discussed in the context of the storage control system 150 of FIG. 1B and the diagram of the example scenario of FIG. 4.

At step 500, the cluster redistribution module 162 obtains measurement information for the first server node. For example, cluster redistribution module 162 may obtain the total utilization amounts for each of the resources of the first server node. The cluster redistribution module 162 may also obtain the separate utilization amounts for each of the resources for each of the processing group assigned to the first server node.

At step 502, cluster redistribution module 162 determines the amount of utilization of a hardware resource of the first server node, for example, based at least in part on the obtained measurement information.

At step 504, cluster redistribution module 162 determines whether or not the amount of utilization of the hardware resource is above a threshold amount, for example, as described above. If the cluster redistribution module 162 determines that the amount of utilization is not above the threshold amount, the process returns to step 500 and additional measurement information may be obtained. If the cluster redistribution module 162 determines that the amount of utilization is above the threshold amount, the process proceeds to step 506.

At step 506, cluster redistribution module 162 selects a given processing group for redistribution. For example, the given processing group may be selected in the manner described above, e.g., the processing group having the highest utilization of the hardware resource on the server or in any other manner.

At step 508, cluster redistribution module 162 determines that a second server node comprises enough available capacity. For example, as described above, in some embodiments, the cluster redistribution module 162 may select the server node with the lowest utilization of the hardware resource as the second server node. In other embodiments, the vectors described above may be utilized to select the second server node.

At step 510, cluster redistribution module 162 redistributes the given processing group to the second server node.

The particular processing operations and other system functionality described above in conjunction with the flow diagram of FIG. 5 are presented by way of illustrative examples only, and should not be construed as limiting the scope of the disclosure in any way. Alternative embodiments can use other types of processing operations for implementing functionality for redistributing processing groups. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to handle multiple page ranges and associated metadata within a given storage system.

Functionality such as that described in conjunction with the flow diagram of FIG. 5 can be implemented at least in part in the form of one or more software programs stored in memory and executed by a processor of a processing device such as a computer or server.

Figure 6:
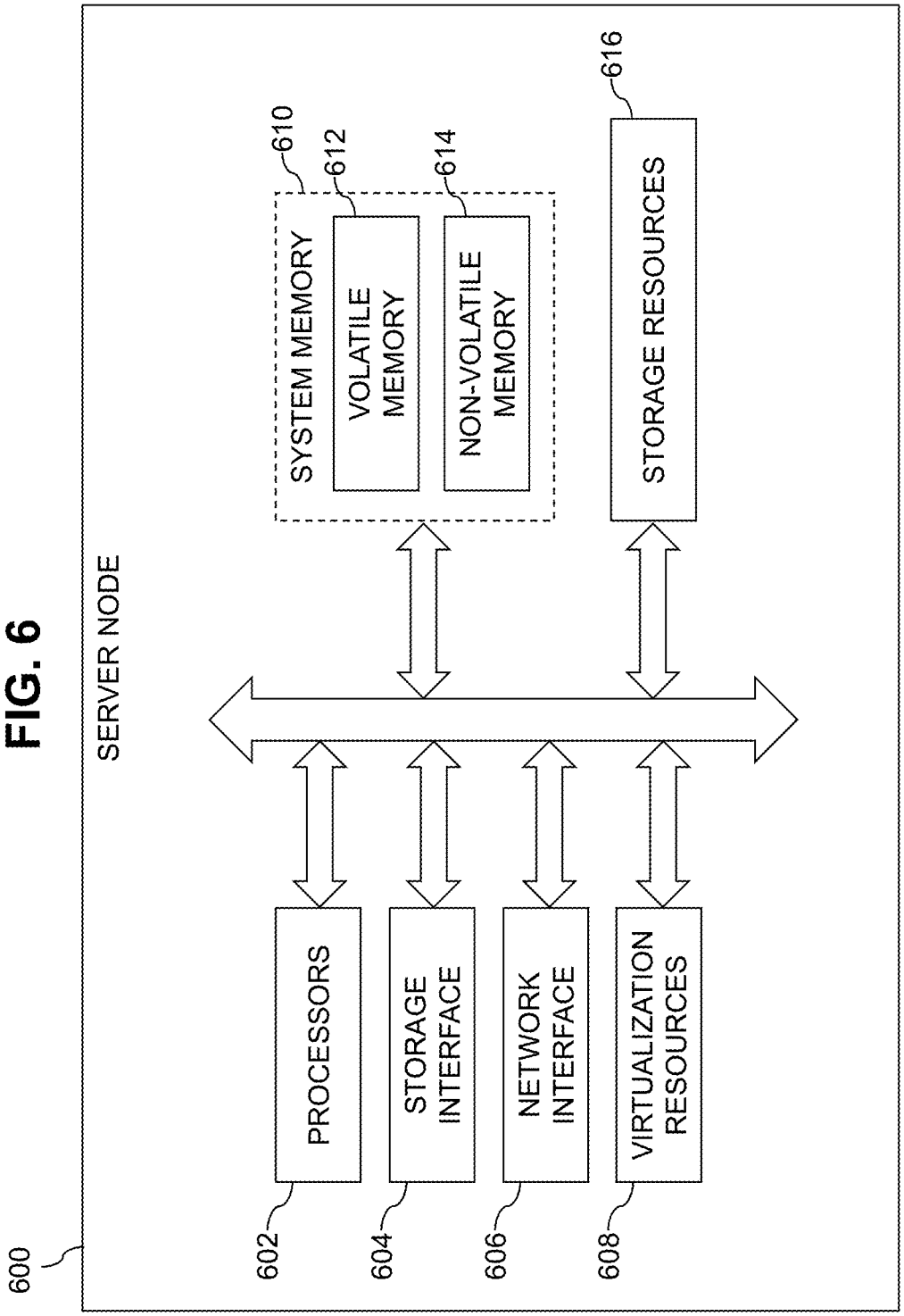
FIG. 6 schematically illustrates an example framework of a server node for implementing a storage node which hosts a log-structured storage control system according to an exemplary embodiment of the disclosure.

FIG. 6 schematically illustrates a framework of a server node (e.g., the storage node(s) 140, FIGS. 1A and 1B) which can be implemented for hosting a storage control system (e.g., the storage control system 150, FIG. 1B), according to an exemplary embodiment of the disclosure. The server node 600 comprises processors 602, storage interface circuitry 604, network interface circuitry 606, virtualization resources 608, system memory 610, and storage resources 616. The system memory 610 comprises volatile memory 612 and non-volatile memory 614.

The processors 602 comprise one or more types of hardware processors that are configured to process program instructions and data to execute a native operating system (OS) and applications that run on the server node 600. For example, the processors 602 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 604 enables the processors 602 to interface and communicate with the system memory 610, the storage resources 616, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 606 enables the server node 600 to interface and communicate with a network and other system components. The network interface circuitry 606 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 608 can be instantiated to execute one or more services or functions which are hosted by the server node 600. For example, the virtualization resources 608 can be configured to implement the various modules and functionalities of the storage control system 150 as shown in FIG. 1B as discussed herein. In one embodiment, the virtualization resources 608 comprise virtual machines that are implemented using a hypervisor platform which executes on the server node 600, wherein one or more virtual machines can be instantiated to execute functions of the server node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 600 as well as execute one or more of the various modules and functionalities of the storage control system 150 of FIG. 1B as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the various components, systems, and modules of the storage control system 150 comprise program code that is loaded into the system memory 610 (e.g., volatile memory 612), and executed by the processors 602 to perform respective functions as described herein. In this regard, the system memory 610, the storage resources 616, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 610 comprises various types of memory such as volatile RAM, NVRAM, or other types of memory, in any combination. The volatile memory 612 may be a dynamic random-access memory (DRAM) (e.g., DRAM DIMM (Dual In-line Memory Module), or other forms of volatile RAM. The non-volatile memory 614 may comprise one or more of NAND Flash storage devices, SSD devices, or other types of next generation non-volatile memory (NGNVM) devices. The system memory 610 can be implemented using a hierarchical memory tier structure wherein the volatile memory 612 is configured as the highest-level memory tier, and the non-volatile memory 614 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 602 to execute a native operating system and one or more applications or processes hosted by the server node 600, and to temporarily store data that is utilized and/or generated by the native OS and application programs and processes running on the server node 600. The storage resources 616 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method comprising:
    obtaining measurement information comprising an indication of an amount of utilization of a hardware resource of a first server node by a plurality of processing groups assigned to the first server node, each processing group comprising an independent set of data and metadata of a log-structured array storage system;
    determining that the amount of utilization of the hardware resource of the first server node is above a threshold amount of utilization based at least in part on the measurement information;
    selecting a given processing group of the plurality of processing groups for redistribution based at least in part on the determination that the amount of utilization of the hardware resource of the first server node is above the threshold amount of utilization and on an amount of utilization of the hardware resource by the given processing group;
    determining that a second server node comprises enough available capacity of the hardware resource to service the determined amount of utilization of the hardware resource by the given processing group; and
    redistributing the given processing group to the second server node based at least in part on the determination that the second server node comprises enough available capacity of the hardware resource to service the determined amount of utilization of the hardware resource by the given processing group;
    wherein the obtaining measurement information comprises measuring resource utilization (i) on a per-group level for each of the plurality of processing groups to generate sets of per-group resource utilization information for respective ones of the processing groups and (ii) on a per-node level for each of the plurality of server nodes to generate sets of per-node resource utilization information for respective ones of the server nodes;
    wherein the determining relating to the first server node, the selecting the given processing group, the determining relating to the second server node, and the redistributing the given processing group are performed based at least in part on the set of per-group resource utilization information and the set of per-node resource utilization information; and
    wherein the method is performed by a storage control system of the log-structured array storage system, the storage control system comprising at least one processor coupled to memory.

2. The method of claim 1 wherein selecting a given processing group for redistribution comprises:
    determining that the amount of utilization of the hardware resource by the given processing group is greater than an amount of utilization of the hardware resource by a second processing group of the plurality of processing groups; and
    selecting the given processing group for redistribution based at least in part on the determination the amount of utilization of the hardware resource by the given processing group is greater than the amount of utilization of the hardware resource by the second processing group of the plurality of processing groups.

3. The method of claim 1 wherein the hardware resource comprises at least one of a central processing unit of the first server node, a memory of the first server node and network bandwidth of the first server node.

4. The method of claim 1 wherein:
    the hardware resource comprises a first hardware resource of a plurality of hardware resources of the first server node, the plurality of hardware resources further comprising a second hardware resource of the first server node;
    the method further comprises:
        determining an amount of utilization of the second hardware resource by the given processing group; and
        determining that the second server node comprises enough available capacity of the second hardware resource to service the determined amount of utilization of the second hardware resource by the given processing group; and
    redistributing the given processing group to the second server node comprises redistributing the given processing group to the second server node based at least in part on the determination that the second server node comprises enough available capacity to service the determined amount of utilization of the second hardware resource by the given processing group.

5. The method of claim 4 the method further comprising:
    determining that an amount of utilization of the second hardware resource on the second server node is above a second threshold amount;
    selecting a third processing group of a second plurality of processing groups that are assigned to the second server node for redistribution based at least in part on a determination that the amount of utilization of the second hardware resource by the third processing group is above the second threshold amount;
  determining that the first server node comprises enough capacity of the second hardware resource to service the determined amount of utilization of the second hardware resource by the third processing group; and
  redistributing the third processing group to the first server node based at least in part on the determination that the first server node comprises enough capacity to service the determined amount of utilization of the second hardware resource by the third processing group.

6. The method of claim 5 wherein determining that the second server node comprises enough capacity of the second hardware resource to service the determined amount of utilization of the second hardware resource by the given processing group comprises determining that the second server node comprises enough capacity of the second hardware resource to service the determined amount of utilization of the second hardware resource by the given processing group based at least in part on the selection of the third processing group for redistribution.

7. The method of claim 1:
  wherein the hardware resource comprises a first hardware resource of a plurality of hardware resources of the first server node;
  wherein the method further comprises:
    generating a first vector for the given processing group, the first vector comprising an amount of utilization of each hardware resource of the plurality of hardware resources by the given processing group;
    generating a second vector for the second server node, the second vector comprising a total amount of utilization of each hardware resource of the plurality of hardware resources by the second server node;
    computing a summation vector based at least in part on the first vector and the second vector; and
    determining that the summation vector comprises a total amount of utilization of each hardware resource of the plurality of hardware resources below a threshold amount for that hardware resource for the second server node; and
  wherein determining that the second server node comprises enough available capacity of the hardware resource to service the determined amount of utilization of the hardware resource by the given processing group comprises determining that the second server node comprises enough available capacity of the plurality of hardware resources based at least in part on the determination that the summation vector comprises a total amount of utilization of each hardware resource of the plurality of hardware resources that is below the threshold amount for each hardware resource for the second server node.

8. An apparatus comprising:
  a storage control system of a log-structured array storage system, the storage control system comprising at least one processor coupled to memory, the at least one processor being configured:
    to obtain measurement information comprising an indication of an amount of utilization of a hardware resource of a first server node by a plurality of processing groups assigned to the first server node, each processing group comprising an independent set of data and metadata of the log-structured array storage system;
    to determine that the amount of utilization of the hardware resource of the first server node is above a threshold amount of utilization based at least in part on the measurement information;
    to select a given processing group of the plurality of processing groups for redistribution based at least in part on the determination that the amount of utilization of the hardware resource of the first server node is above the threshold amount of utilization and on an amount of utilization of the hardware resource by the given processing group;
    to determine that a second server node comprises enough available capacity of the hardware resource to service the determined amount of utilization of the hardware resource by the given processing group; and
    to redistribute the given processing group to the second server node based at least in part on the determination that the second server node comprises enough available capacity of the hardware resource to service the determined amount of utilization of the hardware resource by the given processing group;
  wherein the obtaining measurement information comprises measuring resource utilization (i) on a per-group level for each of the plurality of processing groups to generate sets of per-group resource utilization information for respective ones of the processing groups and (ii) on a per-node level for each of the plurality of server nodes to generate sets of per-node resource utilization information for respective ones of the server nodes; and
  wherein the determining relating to the first server node, the selecting the given processing group, the determining relating to the second server node, and the redistributing the given processing group are performed based at least in part on the set of per-group resource utilization information and the set of per-node resource utilization information.

9. The apparatus of claim 8 wherein selecting a given processing group for redistribution comprises:
  determining that the amount of utilization of the hardware resource by the given processing group is greater than an amount of utilization of the hardware resource by a second processing group of the plurality of processing groups; and
  selecting the given processing group for redistribution based at least in part on the determination the amount of utilization of the hardware resource by the given processing group is greater than the amount of utilization of the hardware resource by the second processing group of the plurality of processing groups.

10. The apparatus of claim 8 wherein the hardware resource comprises at least one of a central processing unit of the first server node, a memory of the first server node and network bandwidth of the first server node.

11. The apparatus of claim 8:
  wherein the hardware resource comprises a first hardware resource of a plurality of hardware resources of the first server node, the plurality of hardware resources further comprising a second hardware resource of the first server node;
  wherein the at least one processor is further configured:
    to determine an amount of utilization of the second hardware resource by the given processing group; and
    to determine that the second server node comprises enough available capacity of the second hardware resource to service the determined amount of utilization of the second hardware resource by the given processing group; and wherein redistributing the given processing group to the second server node comprises redistributing the given processing group to the second server node based at least in part on the determination that the second server node comprises enough available capacity to service the determined amount of utilization of the second hardware resource by the given processing group.

12. The apparatus of claim 11 wherein the at least one processor is further configured:
   to determine that an amount of utilization of the second hardware resource on the second server node is above a second threshold amount;
   to select a third processing group of a second plurality of processing groups that are assigned to the second server node for redistribution based at least in part on a determination that the amount of utilization of the second hardware resource by the third processing group is above the second threshold amount;
   to determine that the first server node comprises enough capacity of the second hardware resource to service the determined amount of utilization of the second hardware resource by the third processing group; and
   to redistribute the third processing group to the first server node based at least in part on the determination that the first server node comprises enough capacity to service the determined amount of utilization of the second hardware resource by the third processing group.

13. The apparatus of claim 12 wherein determining that the second server node comprises enough capacity of the second hardware resource to service the determined amount of utilization of the second hardware resource by the given processing group comprises determining that the second server node comprises enough capacity of the second hardware resource to service the determined amount of utilization of the second hardware resource by the given processing group based at least in part on the selection of the third processing group for redistribution.

14. The apparatus of claim 8:
   wherein the hardware resource comprises a first hardware resource of a plurality of hardware resources of the first server node;
   wherein the at least one processor is further configured:
      to generate a first vector for the given processing group, the first vector comprising an amount of utilization of each hardware resource of the plurality of hardware resources by the given processing group;
      to generate a second vector for the second server node, the second vector comprising a total amount of utilization of each hardware resource of the plurality of hardware resources by the second server node;
      to compute a summation vector based at least in part on the first vector and the second vector; and
      to determine that the summation vector comprises a total amount of utilization of each hardware resource of the plurality of hardware resources below a threshold amount for that hardware resource for the second server node; and
   wherein determining that the second server node comprises enough available capacity of the hardware resource to service the determined amount of utilization of the hardware resource by the given processing group comprises determining that the second server node comprises enough available capacity of the plurality of hardware resources based at least in part on the determination that the summation vector comprises a total amount of utilization of each hardware resource of the plurality of hardware resources that is below the threshold amount for each hardware resource for the second server node.

15. A computer program product comprising a non-transitory processor-readable storage medium having stored therein program code of one or more software programs, the program code when executed by a storage control system of a log-structured array storage system, the storage control system comprising at least one processor coupled to memory, causes the at least one processor:
   to obtain measurement information comprising an indication of an amount of utilization of a hardware resource of a first server node by a plurality of processing groups assigned to the first server node, each processing group comprising an independent set of data and metadata of the log-structured array storage system;
   to determine that the amount of utilization of the hardware resource of the first server node is above a threshold amount of utilization based at least in part on the measurement information;
   to select a given processing group of the plurality of processing groups for redistribution based at least in part on the determination that the amount of utilization of the hardware resource of the first server node is above the threshold amount of utilization and on an amount of utilization of the hardware resource by the given processing group;
   to determine that a second server node comprises enough available capacity of the hardware resource to service the determined amount of utilization of the hardware resource by the given processing group; and
   to redistribute the given processing group to the second server node based at least in part on the determination that the second server node comprises enough available capacity of the hardware resource to service the determined amount of utilization of the hardware resource by the given processing group;
   wherein the obtaining measurement information comprises measuring resource utilization (i) on a per-group level for each of the plurality of processing groups to generate sets of per-group resource utilization information for respective ones of the processing groups and (ii) on a per-node level for each of the plurality of server nodes to generate sets of per-node resource utilization information for respective ones of the server nodes; and
   wherein the determining relating to the first server node, the selecting the given processing group, the determining relating to the second server node, and the redistributing the given processing group are performed based at least in part on the set of per-group resource utilization information and the set of per-node resource utilization information.

16. The computer program product of claim 15 wherein selecting a given processing group for redistribution comprises:
   determining that the amount of utilization of the hardware resource by the given processing group is greater than an amount of utilization of the hardware resource by a second processing group of the plurality of processing groups; and
   selecting the given processing group for redistribution based at least in part on the determination the amount of utilization of the hardware resource by the given processing group is greater than the amount of utilization of the hardware resource by the second processing group of the plurality of processing groups.

17. The computer program product of claim 15 wherein the hardware resource comprises at least one of a central processing unit of the first server node, a memory of the first server node and network bandwidth of the first server node.

18. The computer program product of claim 15:
wherein the hardware resource comprises a first hardware resource of a plurality of hardware resources of the first server node, the plurality of hardware resources further comprising a second hardware resource of the first server node;
wherein the program code further causes the at least one processor:
to determine an amount of utilization of the second hardware resource by the given processing group; and
to determine that the second server node comprises enough available capacity of the second hardware resource to service the determined amount of utilization of the second hardware resource by the given processing group; and
wherein redistributing the given processing group to the second server node comprises redistributing the given processing group to the second server node based at least in part on the determination that the second server node comprises enough available capacity to service the determined amount of utilization of the second hardware resource by the given processing group.

19. The computer program product of claim 18 wherein the program code further causes the at least one processor:
to determine that an amount of utilization of the second hardware resource on the second server node is above a second threshold amount;
to select a third processing group of a second plurality of processing groups that are assigned to the second server node for redistribution based at least in part on a determination that the amount of utilization of the second hardware resource by the third processing group is above the second threshold amount;
to determine that the first server node comprises enough capacity of the second hardware resource to service the determined amount of utilization of the second hardware resource by the third processing group; and
to redistribute the third processing group to the first server node based at least in part on the determination that the first server node comprises enough capacity to service the determined amount of utilization of the second hardware resource by the third processing group;
wherein determining that the second server node comprises enough capacity of the second hardware resource to service the determined amount of utilization of the second hardware resource by the given processing group comprises determining that the second server node comprises enough capacity of the second hardware resource to service the determined amount of utilization of the second hardware resource by the given processing group based at least in part on the selection of the third processing group for redistribution.

20. The computer program product of claim 15:
wherein the hardware resource comprises a first hardware resource of a plurality of hardware resources of the first server node;
wherein the program code further causes the at least one processor:
to generate a first vector for the given processing group, the first vector comprising an amount of utilization of each hardware resource of the plurality of hardware resources by the given processing group;
to generate a second vector for the second server node, the second vector comprising a total amount of utilization of each hardware resource of the plurality of hardware resources by the second server node;
to compute a summation vector based at least in part on the first vector and the second vector; and
to determine that the summation vector comprises a total amount of utilization of each hardware resource of the plurality of hardware resources below a threshold amount for that hardware resource for the second server node; and
wherein determining that the second server node comprises enough available capacity of the hardware resource to service the determined amount of utilization of the hardware resource by the given processing group comprises determining that the second server node comprises enough available capacity of the plurality of hardware resources based at least in part on the determination that the summation vector comprises a total amount of utilization of each hardware resource of the plurality of hardware resources that is below the threshold amount for each hardware resource for the second server node.

* * * * *